United States Patent [19]
Abraham et al.

[11] Patent Number: 5,491,041
[45] Date of Patent: Feb. 13, 1996

[54] SOLID-STATE SECONDARY BATTERIES WITH GRAPHITE ANODES

[75] Inventors: Kuzhikalail M. Abraham, Needham; Mohamed Alamgir, Dedham; Zhiping Jiang, Sharon, all of Mass.

[73] Assignee: EIC Laboratories, Inc., Norwood, Mass.

[21] Appl. No.: 323,180

[22] Filed: Oct. 14, 1994

[51] Int. Cl.⁶ .................................................. H01M 4/60
[52] U.S. Cl. ..................... 429/212; 429/192; 429/213; 429/214
[58] Field of Search .................... 429/192, 213, 429/212, 214

[56] References Cited

U.S. PATENT DOCUMENTS

| | | | |
|---|---|---|---|
| 4,948,685 | 8/1990 | Ohsawa et al. | 429/213 |
| 5,019,469 | 5/1991 | Muller | 429/212 |
| 5,110,694 | 5/1992 | Nagasubramanian et al. | 429/192 |
| 5,130,211 | 6/1992 | Wilkinson et al. | 429/198 |
| 5,183,715 | 2/1993 | North | 429/192 |
| 5,219,679 | 9/1993 | Abraham et al. | 429/192 |
| 5,252,413 | 10/1993 | Alamgir et al. | 429/192 |
| 5,275,750 | 1/1994 | Sato et al. | 429/192 |
| 5,370,949 | 12/1994 | Davidson et al. | 429/224 |

OTHER PUBLICATIONS

Dahn et al. "Suppression of staging of lithium–intercalated carbon by disorder in the host". Phys. Rev. B, 42 (10) 6424–6432 (1990).

Owen et al in *Fast Ionic Transport in Solids*, Bales and Farrington, eds, 1981, pp. 343–346.

*Primary Examiner*—Prince Willis, Jr.
*Assistant Examiner*—Carol Chaney

[57] ABSTRACT

Solid-state rechargeable secondary batteries comprise a composite cathode selected from the group consisting of $LiNiO_2$, $LiCoO_2$, and $LiMn_2O_4$, a separator composed of a solid polymer electrolyte with propylene carbonate as a plasticizer, and a composite anode consisting of graphite, a solid polymer electrolyte containing propylene carbonate and 12-crown-4 ether.

5 Claims, 9 Drawing Sheets

SOLID-STATE SECONDARY BATTERIES WITH GRAPHITE ANODES

This invention was made with support from the U.S. Government under Contract NAS9-18924 awarded by the National Aeronautics and Space Administration. The Government has certain rights in this invention.

FIELD OF INVENTION

This invention pertains to the use of an additive to achieve rechargeability for solid-state batteries comprising a graphite composite anode, a reversible composite cathode consisting of a Li intercalating transition metal compound, and a solid polymer electrolyte which serves both as the separator in the battery to electronically insulate the anode from the cathode and the medium to transport Li ions between the anode and the cathode. In a battery, the anode is the negative electrode and the cathode is the positive electrode. Both the graphite composite anode and the Li intercalating composite cathode are Li insertion electrodes. The term composite electrode, with reference to either the anode or the cathode, means an electrode composed of an electrochemically active material, a polymer electrolyte and, if necessary, a material to provide adequate electronic conductivity to the electrode. The term intercalation (or synonymously insertion) electrode means that Li ions ($Li^+$) are inserted into the crystal lattice of the anode and the cathode materials during charge and discharge, respectively, of the battery, with the positive charge on the Li ion being compensated by electrons introduced into the conduction bands of the insertion electrode from the external circuit. Examples of Li intercalation (insertion) cathodes are lithiated cobalt dioxide ($LiCoO_2$), lithiated nickel dioxide ($LiNiO_2$) and lithiated manganese oxide ($LiMn_2O_4$). Both graphite and certain disordered carbons are examples of Li intercalation anodes.

An example of a solid polymer electrolyte (SPE) is that described in U.S. Pat. No. 5,219,679, consisting of polyacrylonitrile (PAN), propylene carbonate (PC), ethylene carbonate (EC), and a Li salt taken from the group of low-lattice energy Li salts, e.g., $LiPF_6$, $LiAsF_6$, $LiN(SO_2CF_3)_2$ and $LiClO_4$. The organic solvents EC and PC are plasticizers in the solid polymer electrolyte. Another example of a solid polymer electrolyte is that described in U.S. Pat. No. 5,252,413, consisting of poly(vinyl chloride) (PVC), PC, EC and a Li salt such as $LiPF_6$, $LiAsF_6$, $LiN(SO_2CF_3)_2$ or $LiClO_4$. A typical composition of the PAN-based electrolyte is 13.5 (weight-percent) w/o PAN-37.5 w/o EC-37.5 w/o PC-11.5 w/o $LiPF_6$. A typical composition of the PVC-based electrolyte is 15 w/o PVC-30 w/o EC-50 w/o PC-5 w/o $LiClO_4$. Both the composite anode and the composite cathode contain a solid polymer electrolyte as one of its constituents. Therefore, if PC is present in the polymer electrolyte, then it will also be present in the composite anode and the composite cathode.

An object of this invention is to provide rechargeability to solid polymer electrolyte based solid-state batteries which have graphite anodes and contain propylene carbonate as a plasticizer in the SPE. In particular, this invention pertains to the use of 12-crown-4 ether in the graphite composite anode to prevent the reduction of PC and, in consequence, provide rechargeability to the battery. Accordingly, an object of this invention is to provide a rechargeable solid-state battery composed of a rechargeable graphite composite anode consisting of graphite, a solid polymer electrolyte containing PC and 12-crown-4 ether, a separator consisting of a solid polymer electrolyte containing propylene carbonate as a plasticizer, and a reversible composite cathode consisting of a transition metal compound which contains Li. Examples of the latter include, but not limited to, transition metal oxides such as $Li_xCoO_2$, $Li_xNiO_2$, $Li_xMn_2O_4$, $Li_xV_2O_5$ and $Li_xV_6O_3$ and transition metal sulfides such as $Li_xVS_2$, $Li_xCr_{0.5}V_{0.5}S_2$, and $Li_xTiS_2$. Batteries containing anodes and cathodes of the type described are called Li-ion batteries. As it can be surmised from the compositions of the cathode and the anode materials, Li-ion batteries are fabricated in the discharged state and are activated by a charge first. Accordingly, this invention pertains to solid-state Li-ion batteries and, in particular, to the rechargeability of such batteries brought about by the incorporation of 12-crown-4 in the composite anode.

BACKGROUND OF THE INVENTION

The desirability of a mixture of EC and PC as plasticizers to increase the conductivity of alkali metal ion-conductive solid polymer electrolytes has been clearly taught in U.S. Pat. Nos. 5,219,679 and 5,252,413 which disclose poly(acrylonitrile)- and poly(vinyl chloride)-based electrolytes. The use of the plasticizer mixture of EC and PC results in high conductivities in the ambient temperature range of $-20°$ to $50°$ C.; for example, typical conductivities of $10^{-4}$ $ohm^{-1}.cm^{-1}$ at $-20°$ C., $2 \times 10^{-3}$ $ohm^{-1}.cm^{-1}$ at $25°$ C. and $4 \times 10^{-3}$ $ohm^{-1}.cm^{-1}$ at $50°$ C. have been realized. When these solid polymer electrolytes are used in solid-state Li-ion batteries containing a graphite composite anode, the PC undergoes electrochemical reduction on the graphite electrode generating gases during the initial charge by which the battery is activated. Because of this reaction of PC, the battery cannot be discharged after the initial charge. Thus, while the presence of PC yields an electrolyte with high conductivity, it prevents the Li-ion battery from being rechargeable. Consequently, a method to mitigate or eliminate the reduction of PC is highly desirable to provide rechargeability to the battery.

Wilkinson et al. (U.S. Pat No. 5,130,211) also observed electrochemical reduction of PC on graphite when the latter was used as the anode in liquid electrolyte-containing cells in which the liquid electrolyte was composed of a solution of a Li salt in PC. They claimed that addition of one or more compounds selected from the group consisting of glymes, crown ethers and cryptands to the liquid electrolyte mitigated the reduction of PC on graphite. However, Wilkinson et al. did not teach a method of providing rechargeability to solid polymer electrolyte-based Li ion batteries containing graphite anodes, nor were they specific about the most effective additive for use in solid-state batteries. We have found that a convenient way of alleviating the reduction of PC in solid-state batteries and, thereby, providing rechargeability to such batteries is to incorporate 12-crown-4 ether in the composite graphite anode. We have also found that the most important criterion for the use of 12-crown-4 ether as an effective additive in said solid-state batteries is the mass ratio between 12-crown-4 and graphite in the composite anode. An optimum amount of 12-crown-4 ether must be present in the composite anode. Accordingly, a principal object of this invention is the provision of a method for preventing the reduction of PC in solid-state batteries containing graphite anodes, thereby, providing rechargeability to such batteries by means of a graphite composite anode containing an optimum amount of 12-crown-4.

PREFERRED EMBODIMENT OF THE INVENTION

Figure 1:
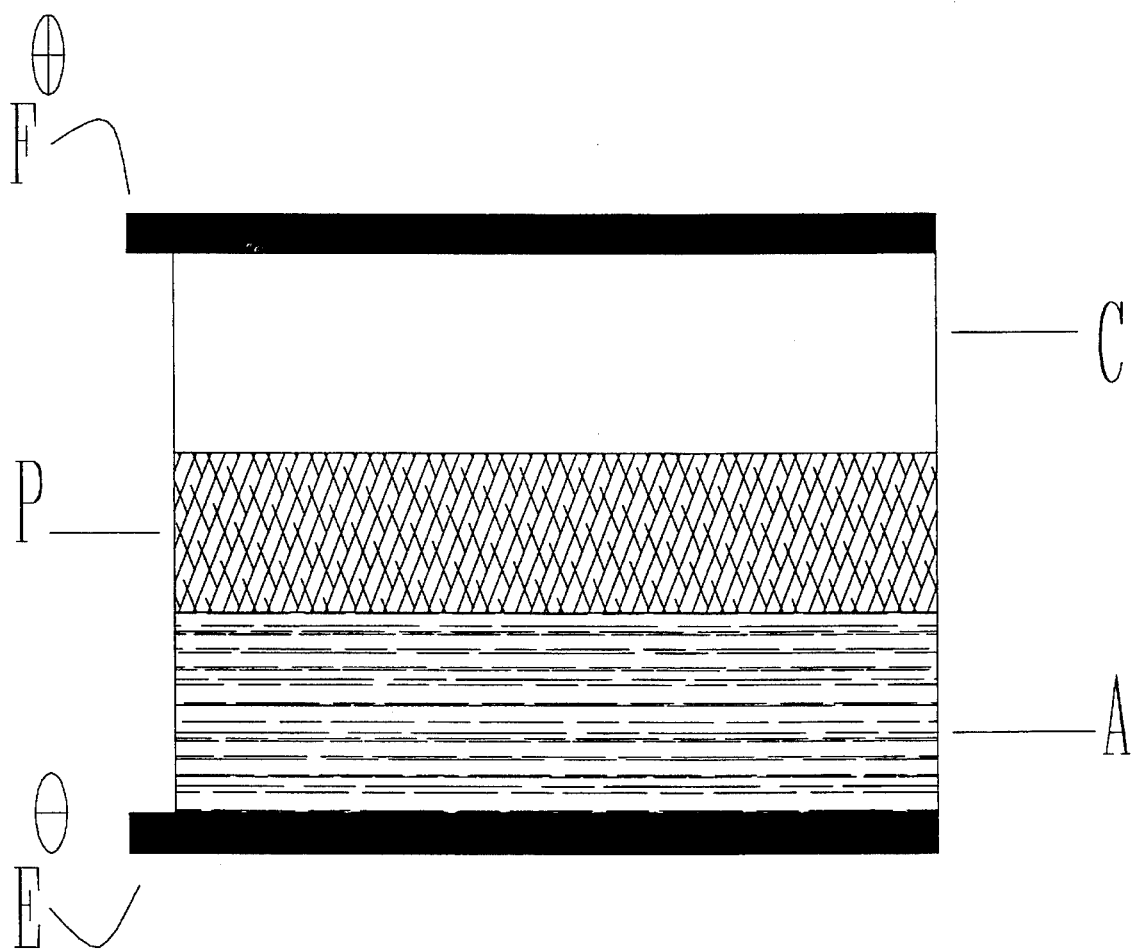
FIG. 1 depicts a schematic of a polymer electrolyte battery.

This invention features a solid polymer electrolyte-based solid-state battery consisting of a composite graphite anode, a composite cathode derived from a lithium intercalated transition metal compound, and a solid polymer electrolyte in which propylene carbonate is present as a plasticizer. The salient features of such a battery is best understood with reference to FIG. 1 which schematically depicts it. In this figure A is the composite graphite anode, P is the solid polymer electrolyte and C is the composite cathode. The layer of the solid polymer electrolyte film serves two principal functions in the battery; it electronically insulates the cathode from the anode thereby preventing internal short-circuit in the battery; it is also the medium for transporting Li ions between the anode and cathode during discharge and charge of the battery. The solid polymer electrolyte comprises a polymer, for example, poly(acrylonitrile), poly(vinyl chloride) or poly(vinyl sulfone), a plasticizer consisting of propylene carbonate or a mixture of propylene carbonate and another organic solvent or solvents, and a Li salt or a mixture of Li salts. A preferred solid polymer electrolyte is one based on poly(acrylonitrile) with the composition 13.5 weight-percent (w/o) PAN-37.5 w/o EC-37.5 w/o PC-11.5 w/o LiPF$_6$.

The graphite anode is a composite electrode consisting of graphite powder, the polymer electrolyte and 12-crown-4 ether. The latter is also known as 1,4,7,10-tetraoxacyclododecane and has the structure

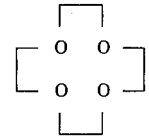

12-crown-4 ether (1,4,7,10-tetraoxacyclododecane)

A preferred embodiment of the intention is 12-crown-4 which is added to the composite anode during its fabrication. We define a carbon as graphite by its X-ray diffraction pattern which is given in Table 1.

TABLE 1

| X-ray Diffraction Data for Graphite. | | |
|---|---|---|
| d (Å) | Relative Intensity | Assignment |
| 3.37 | 100 | 0 0 2 |
| 2.03 | 2 | 1 0 1 |
| 1.68 | 5.5 | 0 0 4 |
| 1.54 | 1.5 | 1 0 3 |

The position of the principal diffraction peak at the d-value of 3.37 Å may vary from sample to sample and can span the range of 3.3 Å to 4 Å. In some instances, samples of graphite may be poorly crystalline and in these materials the principle diffraction peak at or near 3.37 Å may be the only peak present in their X-ray diffraction spectra, and the peak may be a broader one than that exhibited by highly crystalline graphites. For the purpose of practicing this invention by those skilled in the art, a graphite composite anode is that which reacts with Li by an intercalation mechanism. A Li intercalated graphite anode is usually represented by those skilled in the battery an as Li$_x$C$_6$ where x is the number of moles of Li intercalated per mole of graphite (C$_6$).

The cathode of the battery of this invention also consists of a composite electrode containing a Li intercalated transition metal compound and the polymer electrolyte. The cathode composite may also contain a small amount of high surface area carbon black to provide electronic conductivity to the cathode. Typical examples of lithiated transition metal compounds useful as cathodes include the transition metal oxides and sulfides Li$_x$CoO$_2$, Li$_x$NiO$_2$, Li$_x$V$_2$O$_5$, Li$_x$Mn$_2$O$_4$, Li$_x$V$_3$O$_8$, Li$_x$VS$_2$, Li$_x$Cr$_{0.5}$V$_{0.5}$S$_2$ and Li$_x$TiS$_2$. In these formulas of transition metal oxides and sulfides, x represents the number of moles of Li intercalated per mole of the oxide or the sulfide and it varies from one material to the other as it is well known to those skilled in the art. The Li intercalated cathodes used in this invention, for simplicity, may be represented as Li$_x$M$_y$N$_z$, where M is a transition metal, N is oxygen or sulfur and y and z are the stoichiometric coefficients of M and N.

The battery of the invention is assembled by stacking layers of the composite graphite anode, the solid polymer electrolyte and the composite cathode as depicted in FIG. 1. The battery is activated by charging first when the forward reaction shown in equation [1] takes place. The first charge of Li ion batteries is called an "activation charge".

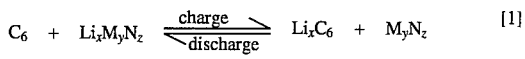

The principal embodiment of this invention can be further illustrated with reference to the data depicted in FIGS. 2 and 3. The graphite/solid polymer electrolyte/Li$_x$Mn$_2$O$_4$ cell in FIG. 2 did not contain any 12-crown-4 ether in the graphite anode while the graphite/solid polymer electrolyte/ Li$_x$Mn$_2$O$_4$ cell in FIG. 3 contained 12-crown-4 ether in the composite graphite anode. The cell in FIG. 2 gave no discharge capacity after the initial activation charge to 4.2 V while that in FIG. 3, containing 12-crown-4 ether in the graphite anode, could be repeatedly discharged and charged. It is clear that a rechargeable solid-state battery with graphite anode and containing PC in the polymer electrolyte is feasible only with the addition of 12-crown-4 ether to the composite anode.

Figure 2:
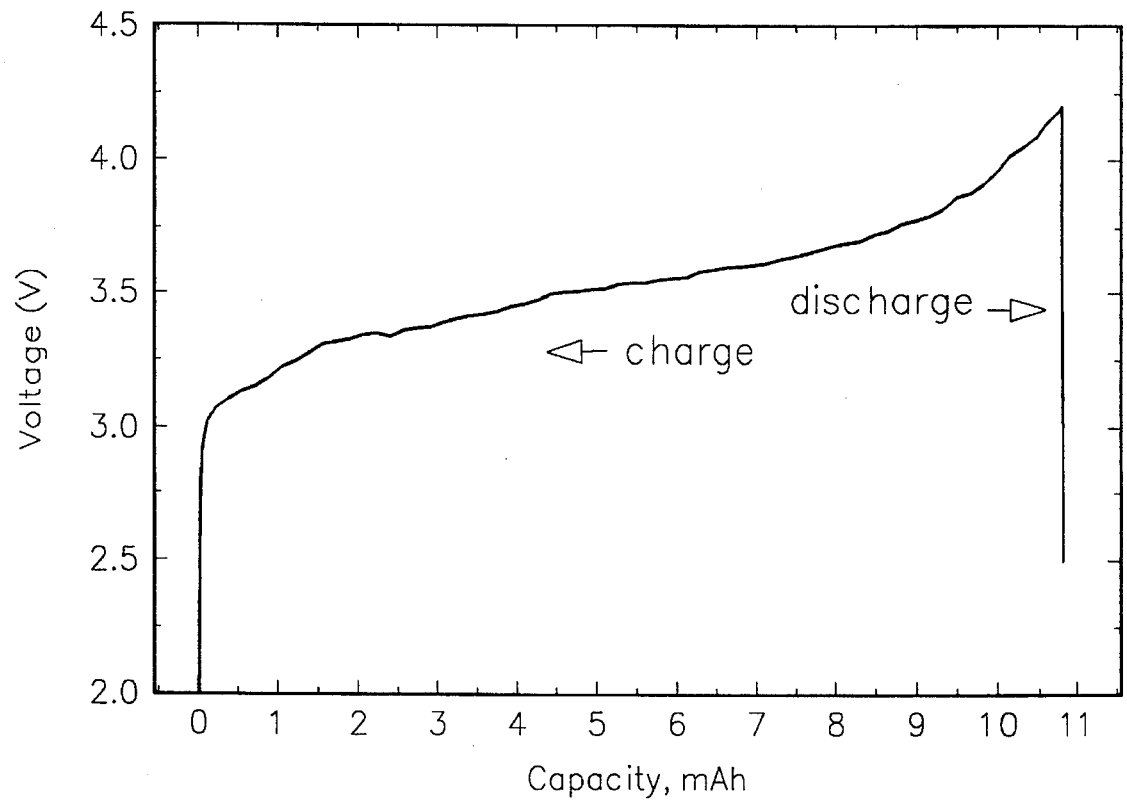
FIG. 2 depicts charge/discharge curves obtained at room temperature for a graphite/PAN-based polymer electrolyte/LiMn$_2$O$_4$ cell. The polymer electrolyte and the composite electrodes contained PC but there was no 12-crown-4 ether in the cell.
Figure 3:
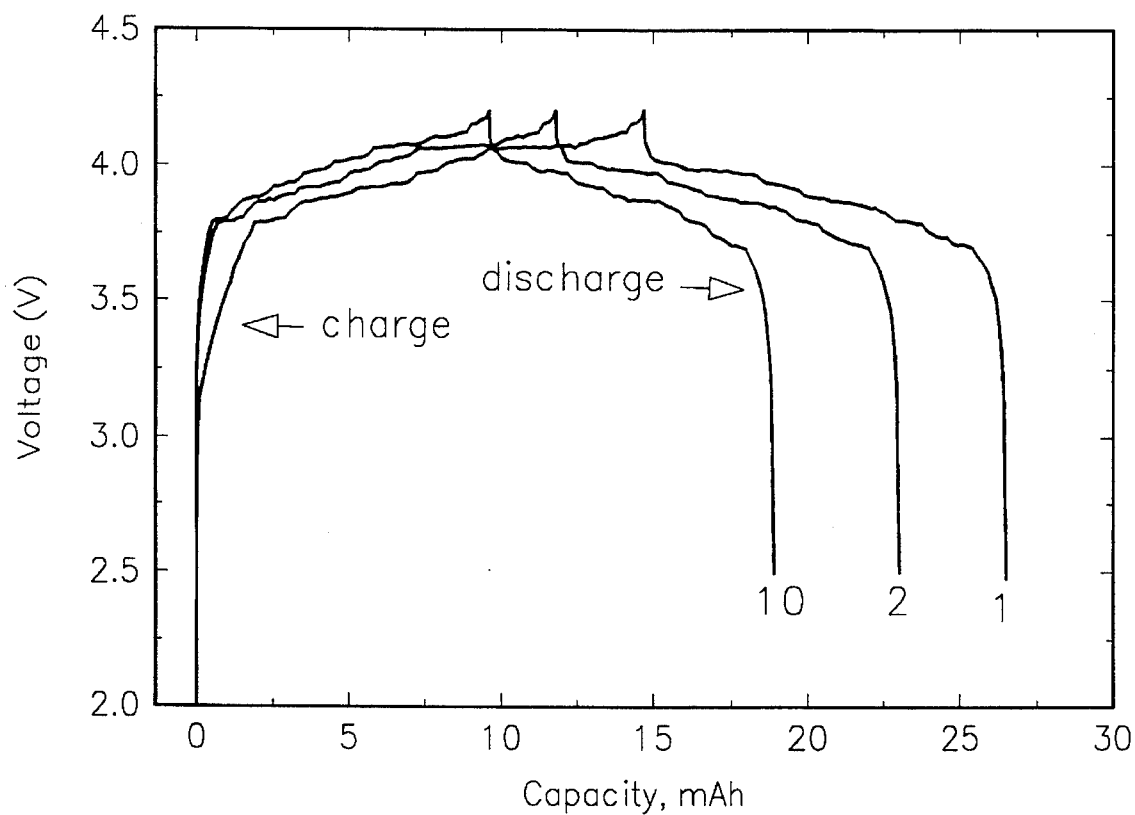
FIG. 3 depicts charge/discharge curves obtained at room temperature for a graphite/PAN-based polymer electrolyte/LiMn$_2$O$_4$ cell. The polymer electrolyte and the composite electrodes contained PC and the graphite composite electrode contained 0.105 gram of 12-crown-4 ether per gram of graphite.
Figure 4:
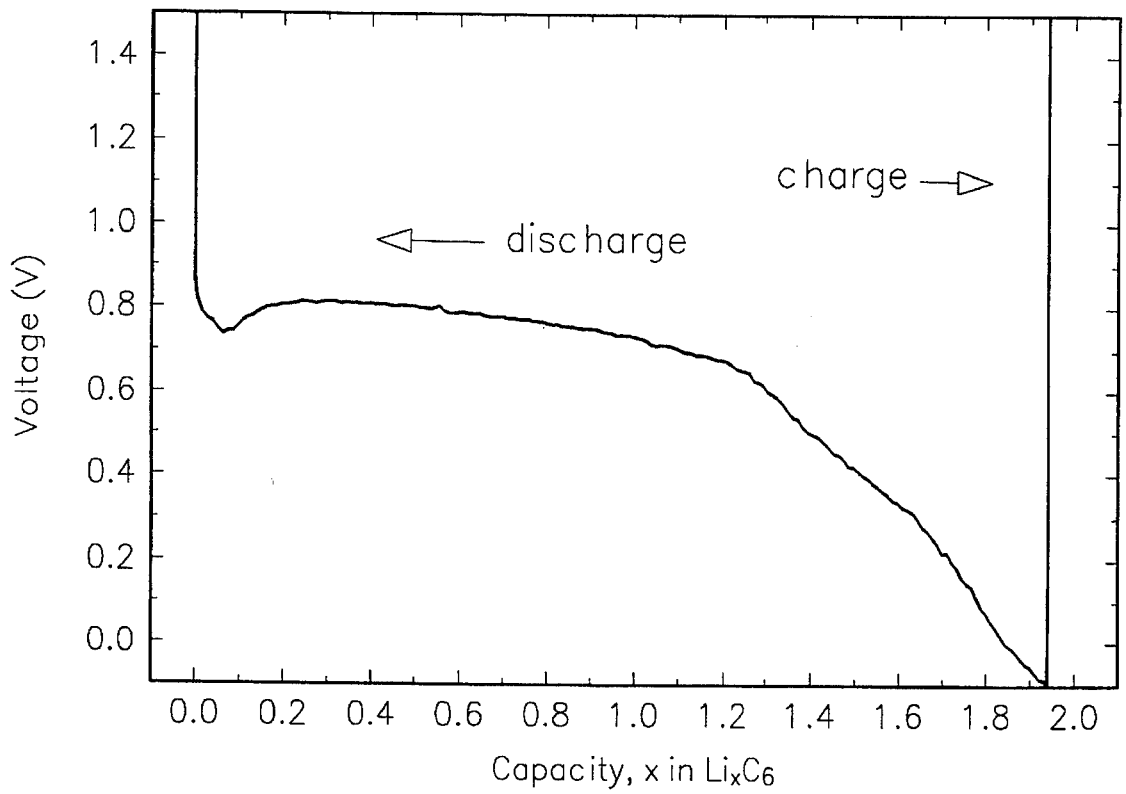
FIG. 4 depicts discharge/charge curves obtained at room temperature for a lithium/PAN-based polymer electrolyte/graphite cell. The discharge and the charge are plotted as voltage versus capacity. The latter is expressed as the amount of Li intercalated per mole of C$_6$. The polymer electrolyte and the graphite composite electrode contained PC but there was no 12-crown-4 ether in the cell.
Figure 5:
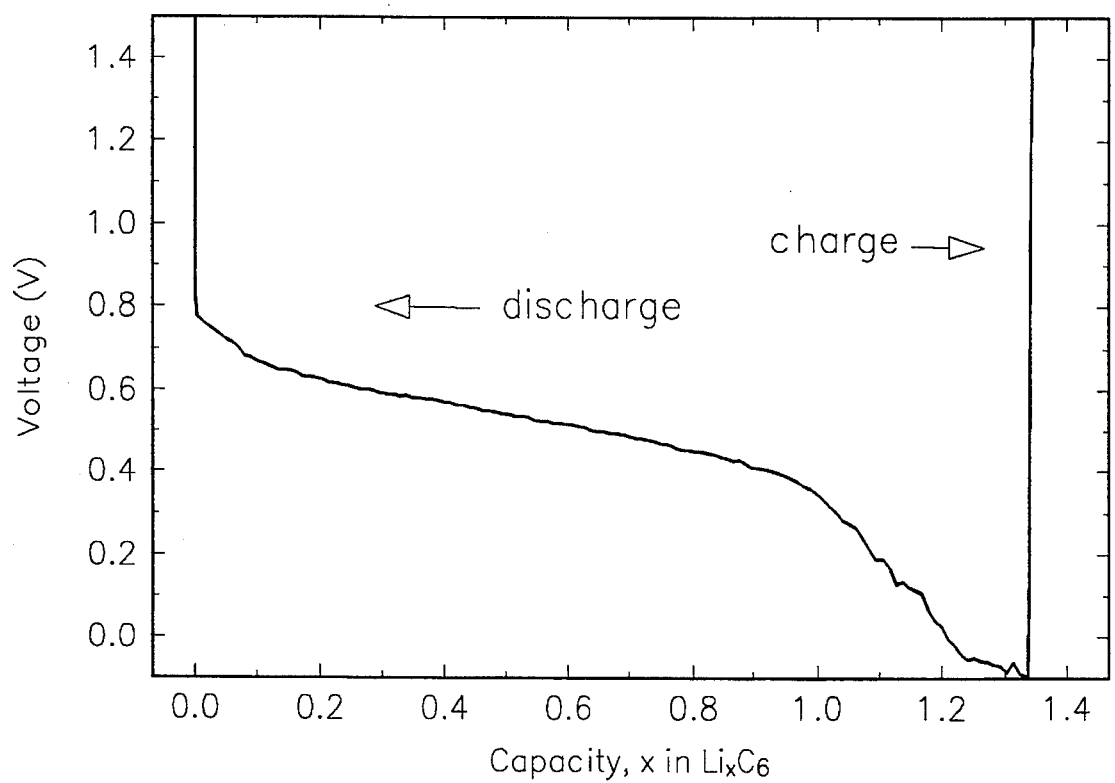
FIG. 5 depicts discharge/charge curves obtained at room temperature for a lithium/PAN-based polymer electrolyte/graphite cell. The polymer electrolyte and the graphite composite electrode contained PC and the graphite composite electrode contained 0.026 gram of 12-crown-4 ether per gram of graphite.
Figure 6:
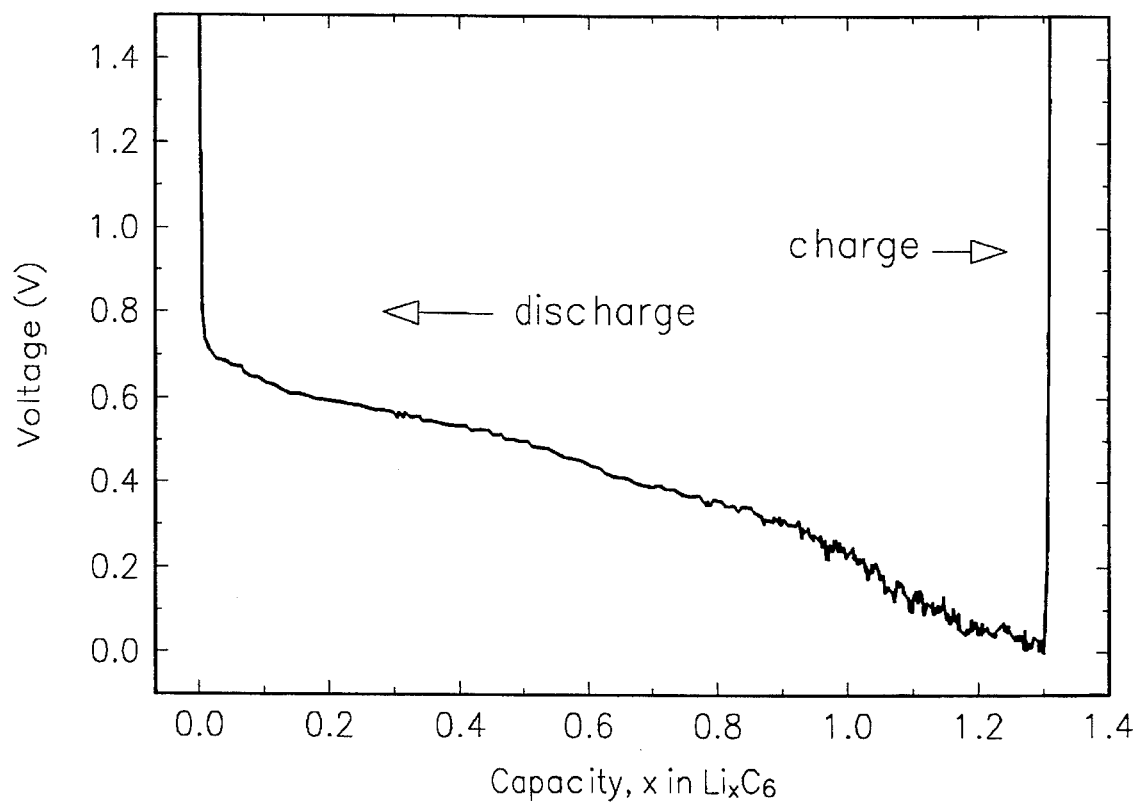
FIG. 6 depicts discharge/charge curves obtained at room temperature for a lithium/PAN-based polymer electrolyte/graphite cell. The polymer electrolyte and the graphite composite electrode contained PC and the graphite composite electrode contained 0.04 gram of 12-crown-4 ether per gram of graphite.
Figure 7:
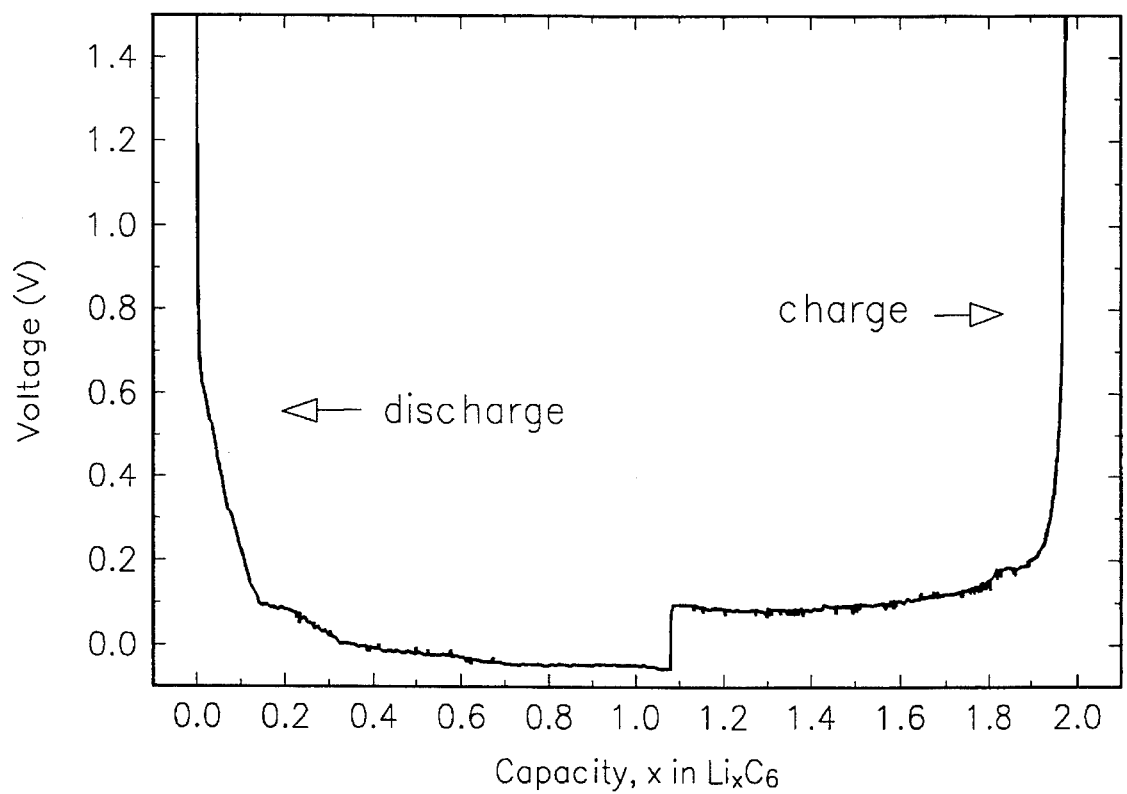
FIG. 7 depicts discharge/charge curves obtained at room temperature for a lithium/PAN-based polymer electrolyte/graphite cell. The polymer electrolyte and the graphite composite electrode contained PC and the graphite composite electrode contained 0.065 gram of 12-crown-4 ether per gram of graphite.

Propylene carbonate reduction as the cause of the irreversibility of the solid-state cell in FIG. 2 was established by the fabrication and testing of solid-state lithium-graphite cells which contained only EC as the plasticizing solvent in the SPE. The use of a lithium-graphite cell to test the performance of a graphite or other composite anodes is well known to those skilled in solid-state battery development. In cells without PC, Li could be reversibly intercalated into graphite with a capacity of 1 mole of Li per mole of $C_6$. However, because of poor conductivities of EC-based electrolytes at room temperature, Li ion solid-state cells with these electrolytes are operated at 40° C. Thus, although Li can be intercalated reversibly into graphite in presence of solid polymer electrolytes that do not contain PC, electrolytes containing propylene carbonate are highly desirable because such cells can be operated at room temperature and below.

The optimum amount of 12-crown-4 ether needed to mitigate PC reduction and provide rechargeability to the anode was determined from a series of experiments in lithium-graphite cells by adding increasing amounts of 12-crown-4 ether to the graphite composite electrode. The Li counter electrode in these cells was separated from the graphite working electrode by the solid polymer electrolyte film. The pertinent experiments and results are presented in Table 2.

TABLE 2

Effect of Crown Ether to Graphite Mass Ratio on the Reversible Intercalation of Li into Graphite.

| Cell No. | Mass Ratio of Crown Ether to Graphite in the Composite Cathode | Reversibly Intercalated Li, Mole per Mole of $C_6$, in the First Cycle |
|---|---|---|
| a | 0:1 | 0 |
| b | 0.026:1 | 0.03 |
| c | 0.040:1 | 0.01 |
| d | 0.065:1 | 0.91 |
| e | 0.082:1 | 0.80 |
| f | 0.105:1 | 1.00 |
| g | 0.210:1 | 0.81 |

Graphical representations of the results of some of the experiments in Table 2 are given in FIG. 4–7. As the data in FIG. 4 clearly show, for a 12-crown-4 ether to graphite mass ratio (i.e., gram of 12-crown-4 ether to gram of graphite) of zero to one (0:1), reduction of PC occurs at a potential of about 0.8 V. A substantial amount of gaseous materials were produced in the cell and no intercalation of Li occurred as indicated by the fact that there was no deintercalation capacity in the cell. When increasing amounts of 12-crown-4 were added to the composite anode, the amount of PC reduced decreased and at the ratio of 0.065:1, used in experiment d (FIG. 7), the amount of PC reduced was brought to a negligible amount. In this cell, Li intercalation into graphite occurred at potentials between about 0.2 and 0.01 V, and the intercalated Li was reversible as shown by the ability of the cell to be charged with a capacity of 0.91 mole of Li per mole of $C_6$. As shown by the results of experiments d, e, f and g in Table 2, very little or no reduction of PC occurs for ratios greater than 0.04:1. The graphite anodes in cells d, e, f and g were discharged and charged reversibly with capacities ranging between 0.8 and 1 mole of Li per mole of $C_6$.

Li salts and plasticizer solvents suitable for preparing the solid polymer electrolytes of this invention are preferably selected on the basis of the same principles used for selecting these components for highly conductive liquid electrolytes, bearing in mind that propylene carbonate is a component of all the electrolyte compositions of this invention. The electrolyte criteria include: 1) Li salts having large anions and low lattice energies such as LiClO$_4$, LiAsF$_6$, LiBF$_4$, LiCF$_3$SO$_3$, LiPF$_6$ and LiN(CF$_3$SO$_2$); 2) organic solvents such as PC with high dielectric constants to promote the dissociation of the low lattice energy Li salts, thereby forming highly conductive electrolyte medium; and 3) organic solvents having electron donor atoms such as O and N through which the solvents can form complexes (or solvates) with the Li salt. These requirements are realized with Li salts such as LiClO$_4$ with a lattice energy of 723 kilo-Joules (kJ)/mole, and organic solvents such as PC and EC with the dielectric constants of 64.4 and 89.6, respectively.

In addition to ethylene carbonate and propylene carbonate, organic solvents preferred for preparing solid polymer electrolytes of the present invention are dimethyl sulfoxide (DMSO), tetramethylene sulfone (sulfolane), γ-butyrolactone, N-methyl Pyrrolidinone (NMP), dimethyl adipate (ADP) and tri- and tetraglymes. These solvents have high boiling points, which augment the preparation of electrolyte films with good dimensional stability. Dimensional stability is defined as the ability of the electrolyte to be isolated as free-standing thin films.

EXAMPLES

Example 1

A graphite/PAN-based polymer electrolyte/LiMn$_2$O$_4$ cell was prepared by sandwiching the polymer electrolyte film (having a thickness of 4 mil) between a LiMn$_2$O$_4$ composite cathode (having a thickness of 4.5 mil) and a graphite composite anode (having a thickness of 2.5 mil).

The preparation of the electrolyte film was carried out by heating a 12:40:40:8 by weight-percent mixture of PAN, EC, PC and LiPF$_6$ at 135° C. until a homogeneous solution was formed. The solution was then poured between two stainless-steel shims coated with Teflon, and passed between two rollers. On cooling, dimensionally stable electrolyte films were formed.

The LiMn$_2$O$_4$ composite cathode was prepared from a 50:8:42 by weight-percent mixture of LiMn$_2$O$_4$, carbon and the polymer electrolyte on an Al shim.

The graphite composite anode was prepared from a 40:60 by weight-percent mixture of graphite and the polymer electrolyte on a Ni shim.

The cell was charged and discharged at room temperature at 0.1 mA/cm$^2$ at the voltage limits between 2.5 and 4.2 V. The cell could be charged, but no capacity was obtained on discharge. The results are graphically presented in FIG. 2.

Example 2

A graphite/PAN-based polymer electrolyte/LiMn$_2$O$_4$ cell was prepared by sandwiching the polymer electrolyte film (having a thickness of 4 mil) between a LiMn$_2$O$_4$ composite cathode (having a thickness of 5 mil) and a graphite composite anode (having a thickness of 3 mil). The electrolyte and the composite LiMn$_2$O$_4$ electrode were prepared in the same was as in Example 1. The graphite electrode was prepared from a 38.5:57.5:4.0 by weight-percent mixture of graphite, the polymer electrolyte and 12-crown-4 ether by depositing it on a Ni shim. The cell was charged and discharged at room temperature at 0.1 mA/cm$^2$ between the voltage limits of 2.5 and 4.2 V. The cell could be both charged and discharged. The results are graphically presented in FIG. 3.

EXAMPLE 3

A Li/PAN-based polymer electrolyte/graphite cell was prepared by sandwiching the polymer electrolyte film (having a thickness of 4 mil) between a Li foil (having a thickness of 2 mil) and a graphite composite electrode (having a thickness of 2.5 mil). The polymer electrolyte and the graphite composite electrode were prepared in the same way as in Example 1. The cell was discharged and charged at room temperature at 0.1 mA/cm$^2$ at the voltage limits between −0.1 and 2.0 V. The cell could be discharged but no capacity was obtained on charge. Thus, this cell is an irreversible one. The results are graphically presented in FIG. 4.

Example 4

A Li/polymer electrolyte/graphite cell was prepared by sandwiching a polymer electrolyte film (having a thickness of 4 mil) between a Li foil (having a thickness of 2 mil) and a graphite composite electrode (having a thickness of 2.5 mil). The electrolyte was prepared in the same way as in Example 1. The graphite composite electrode was prepared from a 39.6:59.4:1.0 by weight-percent mixture of graphite:electrolyte:12-crown-4 ether by depositing it on a Ni shim. There was 0.026 gram of 12-crown-4 ether per gram of graphite. The cell was discharged and charged at room temperature at 0.1 mA/cm$^2$ at the voltage limits between −0.1 and 2.0 V. The cell could be discharged but no capacity was obtained on charge. The results are graphically presented in FIG. 5.

Example 5

A Li/PAN-based polymer electrolyte/graphite cell was prepared by sandwiching a polymer electrolyte film (having a thickness of 4 mil) between a Li foil (having a thickness of 2 mil) and a graphite composite electrode (having a thickness of 2.0 mil). The electrolyte was prepared in the same was as in Example 1. The graphite composite electrode was prepared from a 39.4:59.0:1.6 by weight-percent mixture of graphite, electrolyte and 12-crown-4 ether by depositing it on a Ni shim. There was 0.04 gram of 12-crown-4 ether per gram of graphite. The cell was discharged and charged at room temperature at 0.1 mA/cm$^2$ at the voltage limits between 0 and 2.0 V. The cell could be discharged but no capacity was obtained on charge. Thus, this cell is an irreversible one. The results are graphically presented in FIG. 6.

Example 6

A Li/PAN-based polymer electrolyte/graphite cell was prepared by sandwiching polymer electrolyte film (having a thickness of 4 mil) between a Li foil (having a thickness of 2 mil) and a graphite composite electrode (having a thickness of 2.5 mil). The electrolyte was prepared in the same way as in Example 1. The graphite composite electrode was prepared from a 39.0:58.5:2.5 by weight-percent mixture of graphite, electrolyte and 12-crown-4 ether by depositing it on a Ni shim. There was 0.65 gram of 12-crown-4 ether per gram of graphite. The cell was discharged and charged at room temperature at 0.1 mA/cm$^2$ at the voltage limits between −50 mV and 2.0 V. The cell could be both discharged and charged. Thus, unlike the cells in Examples 3–5, this cell is reversible. The results are graphically presented in FIG. 7.

Example 7

Figure 8:
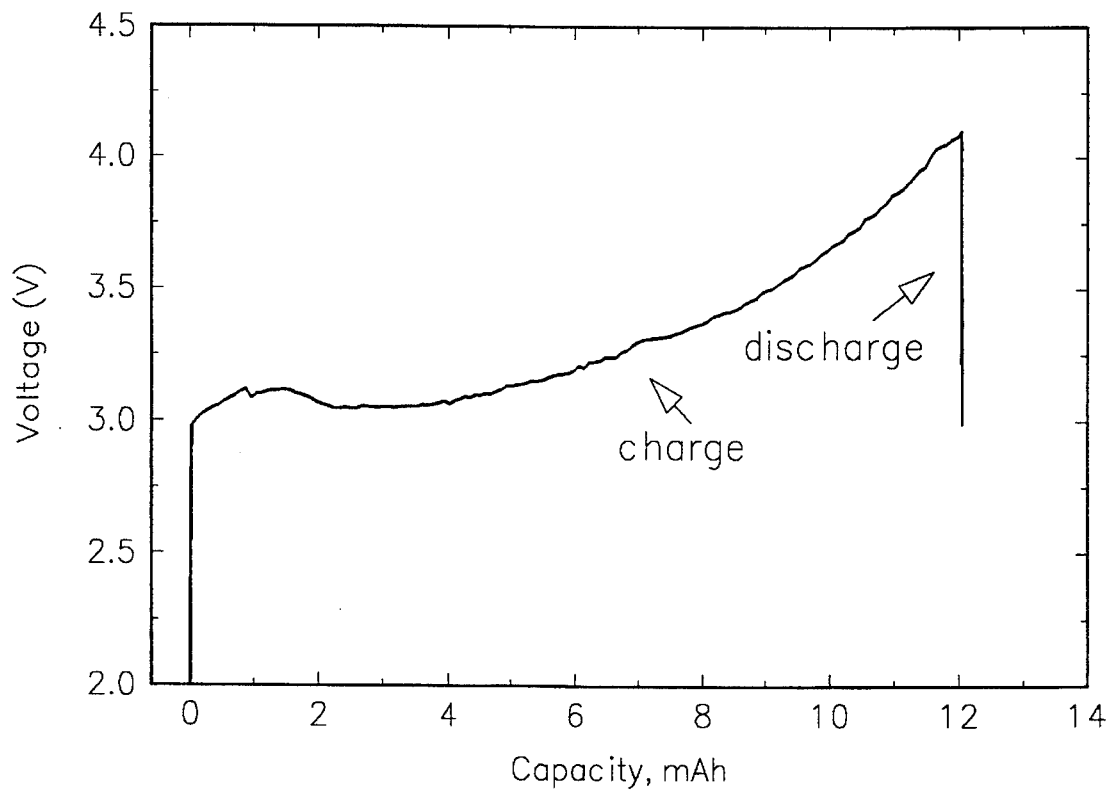
FIG. 8 depicts charge/discharge curves obtained at room temperature for a graphite/PAN-based electrolyte/LiCoO$_2$ cell. The polymer electrolyte and the composite electrodes contained PC but there was no 12-crown-4 ether in the cell.

A graphite/PAN-based polymer electrolyte/LiCoO$_2$ cell was prepared by sandwiching a polymer electrolyte film (having a thickness of 4 mil) between a LiCoO$_2$ composite cathode (having a thickness of 4.0 mil) and a graphite composite anode (having a thickness of 2.8 mil). The electrolyte and the graphite composite electrode were prepared in the same way as in Example 1. The composite LiCoO$_2$ cathode was prepared from a 50:8:42 by weight-percent mixture of LiCoO$_2$, carbon and electrolyte by depositing it on an Al shim. The cell was charged and discharged at room temperature at 0.1 mA/cm$^2$ at the voltage limits between 3.0 and 4.1 V. The cell could be charged but no capacity was obtained on discharge. The results are graphically presented in FIG. 8.

Example 8

Figure 9:
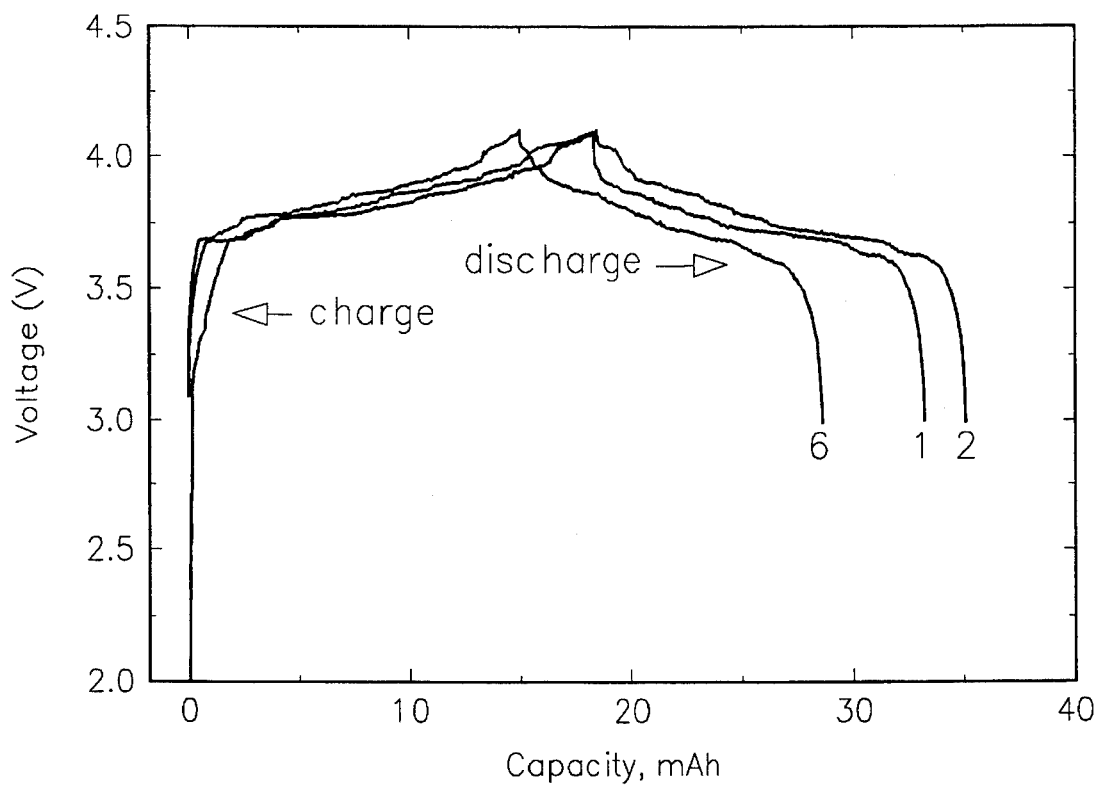
FIG. 9 depicts charge/discharge curves obtained at room temperature for a graphite/PAN-based electrolyte LiCoO$_2$ cell. The polymer electrolyte and the composite electrodes contained PC and the graphite composite electrode contained 0.105 gram of 12-crown-4 ether per gram of graphite.

A graphite/PAN-based polymer electrolyte/LiCoO$_2$ cell was prepared by sandwiching a polymer electrolyte film (having a thickness of 4 mil) between a LiCoO$_2$ composite cathode (having a thickness of 6 mil) and a graphite composite anode (having a thickness of 4 mil). The electrolyte was prepared in the same way as in Example 1. The composite LiCoO$_2$ electrode was prepared in the same way as in Example 7. The graphite composite electrode was prepared in the same way as in Example 2. The cell was charged and discharged at room temperature at 0.1 mA/cm$^2$ at the voltage limits between 3.0 and 4.1 V. The cell could be both charged and discharged. The results are graphically presented in FIG. 9.

Exemplary embodiments of the practice of the present invention are set forth below. It will be appreciated by those skilled in the art that these embodiments are presented solely for the purpose of expositions and should not be construed as limiting.

What is claimed is:

1. A solid state rechargeable electrochemical cell comprising a Li intercalating composite cathode, a solid polymer electrolyte separator composed of a polymer network, a Li salt, and a plasticizer of propylene carbonate or a mixture of propylene carbonate and one or more other solvents, and a composite anode containing graphite as the Li intercalating active material, a polymer electrolyte of the same composition as that in the separator, and 12-crown-4-ether in a weight ratio of 0.05 to 0.21 to graphite.

2. A rechargeable cell of claim 1 wherein said polymer network in the polymer electrolyte is selected from the group consisting of polyacrylonitrile, poly(vinyl chloride), poly(vinyl sulfone), poly(vinyl pyrrolidinone) and poly(ethylene glycol diacrylate), and said Li salt in the polymer electrolyte is selected from the group consisting of $LiPF_6$, $LiAsF_6$, $LiN(SO_2CF_3)_2$, $LiCF_3SO_3$, $LiBF_4$, $LiClO_4$, $LiBR_4$ wherein R is an alkyl or aryl group, LiI and $LiC(SO_2CF_3)_3$.

3. A rechargeable cell of claim 2 wherein said lithium intercalating composite cathode is selected from the group consisting of lithiated transition metal oxides, sulfides or selenides.

4. A rechargeable cell of claim 4 wherein the said lithiated transition metal oxide is selected from the group of lithiated transition metals consisting of $LiNiO_2$, $LiCoO_2$.

5. A rechargeable cell of claim 3 wherein the said lithiated transition metal oxide is selected from lithiated manganese oxides and lithium transition metal oxide compounds.

* * * * *